UNITED STATES PATENT OFFICE.

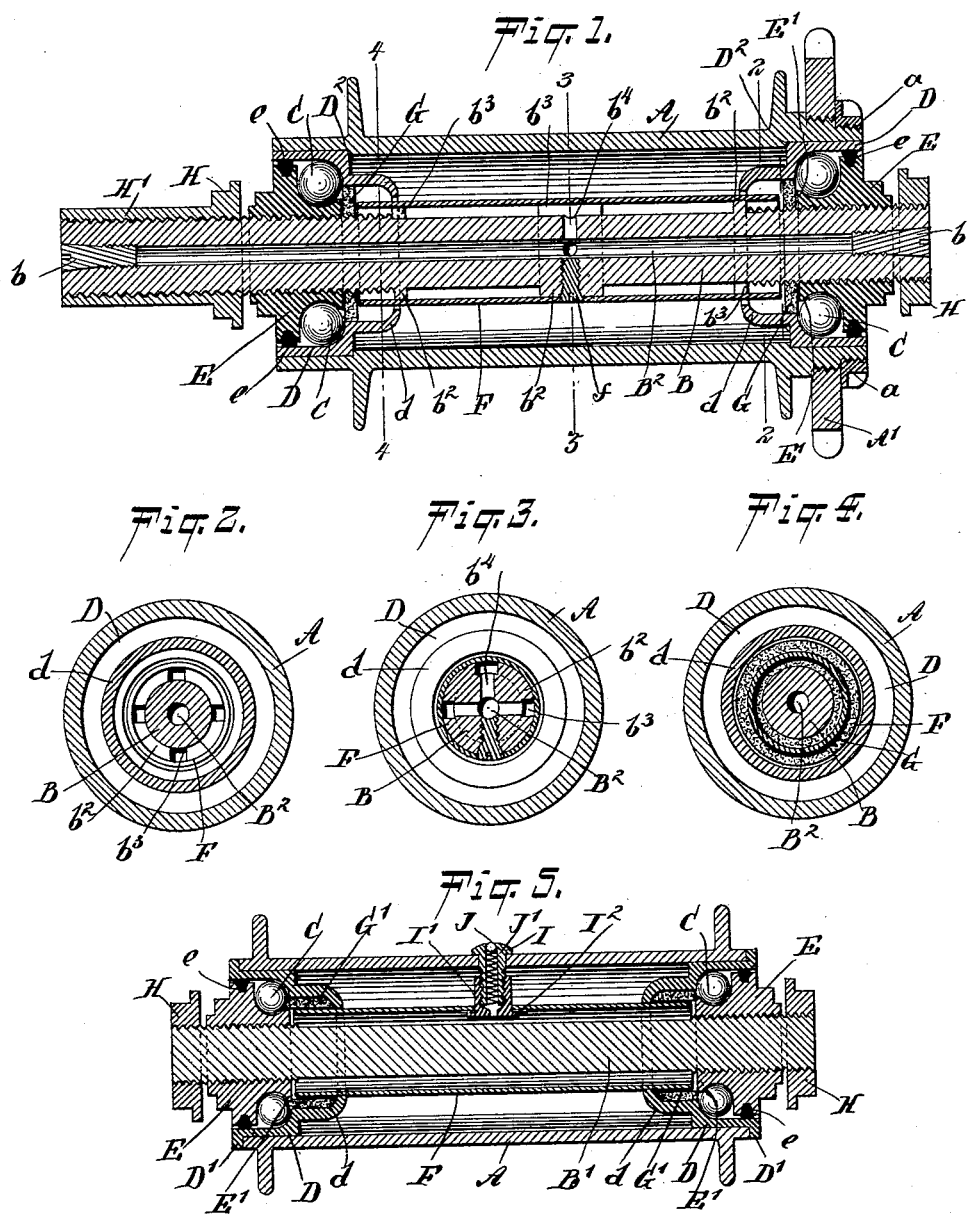

FRANK GUSTAVESON, OF WABASHA, MINNESOTA.

BALL-BEARING.

SPECIFICATION forming part of Letters Patent No. 602,701, dated April 19, 1898.

Application filed September 24, 1897. Serial No. 652,814. (No model.)

*To all whom it may concern:*

Be it known that I, FRANK GUSTAVESON, of Wabasha, in the county of Wabasha and State of Minnesota, have invented a new and Improved Ball-Bearing, of which the following is a full, clear, and exact description.

My invention relates to an improvement in ball-bearings in which the cones and cups forming the raceways of the bearings are shaped so as to furnish a larger bearing-surface than the ordinary cone and also in which the oiling of the bearings may be more effectively accomplished and an oil-reservoir be formed within the hub of the wheel, so that the bearings will not need oiling as often as would otherwise be necessary.

Reference is to be had to the accompanying drawings, forming a part of this specification, in which similar characters of reference indicate corresponding parts in all the views.

Figure 1 is a longitudinal sectional elevation taken through the hub of a bicycle-wheel embodying my invention. Figs. 2, 3, and 4 are sectional views taken, respectively, on the lines 2 2, 3 3, and 4 4 of Fig. 1, and all looking toward the left in said figure; and Fig. 5 is a longitudinal sectional elevation of a modification of the oiling device.

In order to illustrate my invention, it is shown as applied to the hub of a bicycle-wheel, although it is applicable to any form of ball-bearings.

In the drawings, A represents the hub of a bicycle-wheel, which is essentially of the ordinary construction, consisting of a hollow cylinder or tube having spoke-flanges formed thereon. Within each end of the tube A, forming the hub, is inserted the cup D, forming one-half of the ball-raceway. This cup is preferably made to seat against a shoulder $D^2$, formed on the inside of the hub A.

The surfaces upon which the balls rest are formed, as shown in the drawings, of the same curvature as the balls, thus forming a support for the balls, which extends over a considerable area thereof. As ordinary ball-bearings are formed the balls touch the raceways only at one point, while in my improved form of bearings the object is to provide a larger surface of contact between the balls and the raceways. With this end in view the cone E, which is screwed or otherwise formed upon the axle B, is extended inwardly beyond the lateral center of the balls, and upon its inner end portion is enlarged, as shown at E', so as to assure a larger area of contact with the balls. In this construction the ball will not have the cutting or wearing effect which would result were the contact reduced to certain points on the balls. In consequence of this my improved bearings will wear much longer than those of the ordinary form.

As shown in Fig. 1, the axle B is axially bored at $B^2$, which bore extends from one end of the axle to the other. If desired, this bore need not extend through the axle, but may be extended to a point near the center of the hub or to a point just beyond lateral apertures hereinafter described and which connect the bore $B^2$ with the space immediately surrounding the axle B. The construction shown, however, in which the axle is bored throughout its entire length, is preferred. The bore $B^2$ is closed at each end by means of screw-plugs $b$, which securely close said ends. The inner ends of the plugs are screw-threaded and engage with threads formed within the bore $B^2$. The outer ends of said plugs are slightly enlarged and coned, said ends seating within the correspondingly-coned ends of the bore $B^2$.

Near the center of the hub the axle B is apertured at $b^4$, said apertures extending in a radial direction and entering the bore $B^2$. The axle at this point is preferably made slightly larger in diameter than the body thereof, thus forming a flange $b^2$, extending around the axle. At a short distance inward from the cones E the axle is also provided with thin flanges $b^2$ of the same diameter as the one at the center of the axle. These flanges $b^2$ are for the purpose of supporting the inclosed tube or casing F, forming an oil-reservoir and conducting-passage about the axle B. The flanges $b^2$ are crossed by longitudinal passages $b^3$, which permit the oil to flow past the flanges. The casing or tube F, which surrounds the axle, is made to fit closely over the flanges $b^2$ and is secured to the axle by means of a screw $f$. The inner ends of the cups D are extended inward from the raceways and are somewhat contracted, the ends having perforations therein slightly larger than the tube F. The flanges $d$ upon the cups embrace the outer ends of the tube F, but do not contact therewith. The ends of the tube F are brought close up to the raceways, and between the ends of said tube and the inner ends of the cones E are placed washers G, of felt or similar material.

Oil is fed to the bearings by removing one of the screw-plugs $b$ and pouring the oil into the bore $B^2$ while the axle is placed in an inclined or vertical position. The oil in running down the bore $B^2$ will fill the lower end thereof, and the plug $b$ is then reinserted. As the axle is brought to a horizontal position by placing the wheel upright the oil will gradually flow through the apertures $b^4$ into the space surrounding the axle and within the tube F. The oil will gradually work horizontally within said space through passages $b^3$ of flanges $b^2$ until it enters the inwardly-extending flanges $d$ upon the cups D. The oil will gradually soak and filter through the washers G, and thus keep the balls C constantly lubricated without admitting dust.

To prevent dust from entering the reservoir from the outside, the cones E are provided with circumferential grooves, within which are placed felt washers $e$. These washers engage with the flanges of the cups D and prevent access of dirt. The axle B is secured to the frame of the machine by means of nuts H, screwing thereon. One of these nuts may be provided with an extended hub H′, which acts as a stop.

In Fig. 5 is shown a slight modification in construction. In this instance this shaft B′ is made solid. The tube F, which surrounds the shaft, is made to fit tightly within the flanges $d$ of the cups D. The washers G′ are made of a little different form and lie between the ends of the tube F and the flanges $d$ upon the cups. Oil is supplied to the chamber lying between the axle and the tube F by means of the tube formed by the two nipples I and I′.

The nipple I′ is formed with a flange at one end and is inserted through a hole in the side of the tube F from the interior of said tube. A washer $I^2$ may be placed between this flange at the inner side of the tube to make a tight joint. The nipple I′ is interiorly threaded and receives the nipple I therein, the latter being exteriorly threaded and screwing into the nipple I′. Both of these nipples are provided with longitudinal holes, through which the oil may pass. The nipple I is provided with a flange on its outer end which bears against the outer surface of the hub A. The outer end of the hole extending through the nipple I is slightly contracted to form a valve-seat. A ball J is inserted through the hole in the nipple and seats upon the outer end of the said hole, thus closing the same tightly. A spirally-coiled spring J′ is inserted within the hole in said nipple and holds the ball upon its seat.

This construction of the hubs provides for a large oil-reservoir, which will supply oil to the bearings for a long time, thus making it unnecessary to frequently oil the machine, while at the same time assuring liberal oiling. The filtering-washers G and G′ insure that no dirt will enter the bearings with the oil.

Having thus described my invention, I claim as new and desire to secure by Letters Patent—

1. A cup for a ball-bearing, having a cupped flange extending inwardly from the ball-race and forming an oil receiving and retaining cup which is separate from the ball-race, substantially as described.

2. A cup for a ball-bearing, having a flange extending inwardly from the raceway, and cupped or decreased in diameter at its inner end, whereby an oil-receiving cup is formed, and a filtering-washer between said oil-cup and the ball-race, substantially as described.

3. A bicycle-bearing, comprising a hub having cups therein each provided with a flange or collar extending inwardly from the raceway and cupped or decreased in diameter at its inner end, whereby an oil-receiving cup is formed, an axle having cones thereon coöperating with the cups to form ball-raceways, balls between said cones and the raceways of the cups, and a tube surrounding the axle, with its ends entering the oil-receiving cups and constituting an oil-reservoir, substantially as described.

FRANK GUSTAVESON.

Witnesses:
THOMAS KILEY,
MALCOLM KENNEDY.